No. 758,241. PATENTED APR. 26, 1904.
G. J. FRIEND & E. L. BOLTON.
HARVESTER REEL.
APPLICATION FILED JAN. 4, 1904.
NO MODEL.
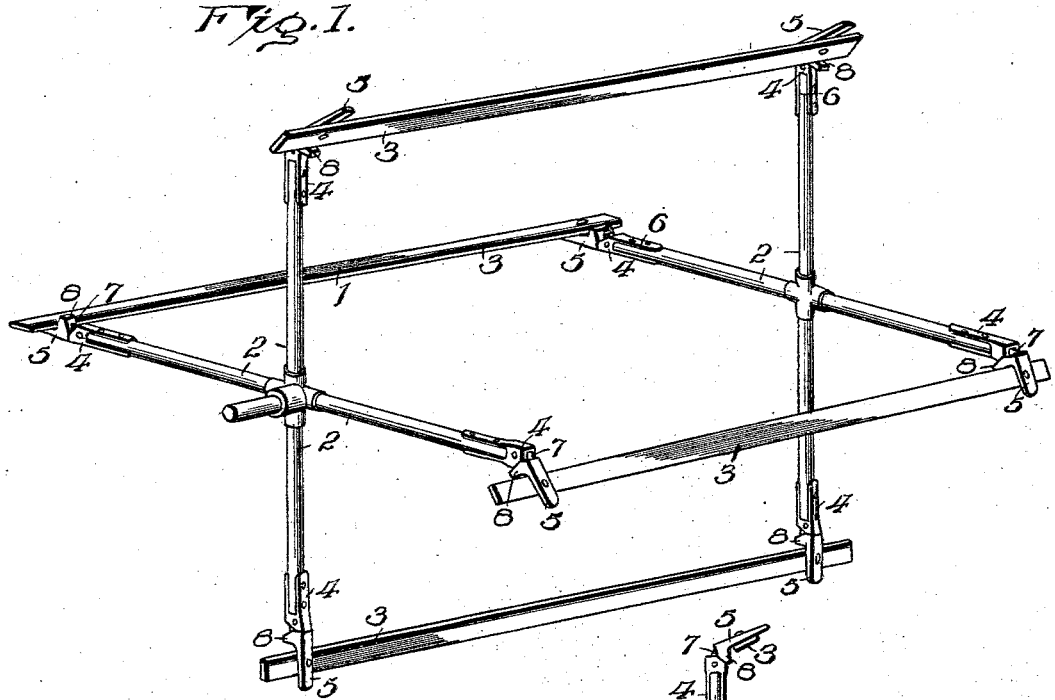
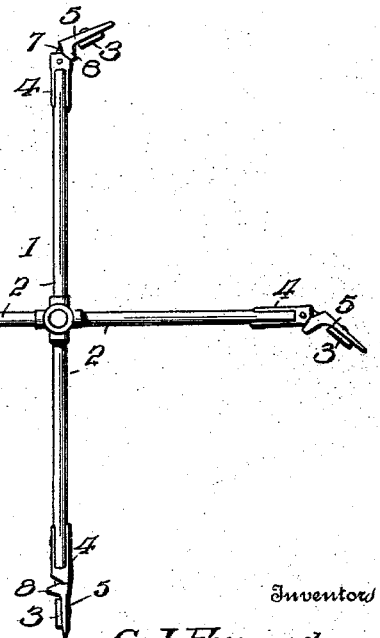
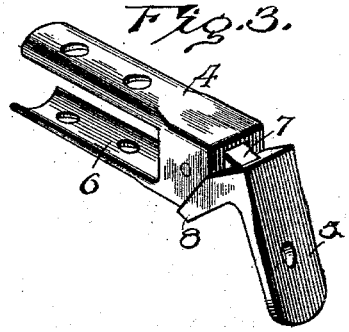
Witnesses
Inventors
G. J. Friend,
E. L. Bolton.
By
Attorneys No. 758,241. Patented April 26, 1904.

UNITED STATES PATENT OFFICE.

GEORGE J. FRIEND AND EDWARD L. BOLTON, OF KINGSLEY, OREGON.

HARVESTER-REEL.

SPECIFICATION forming part of Letters Patent No. 758,241, dated April 26, 1904.

Application filed January 4, 1904. Serial No. 187,706. (No model.)

*To all whom it may concern:*

Be it known that we, GEORGE J. FRIEND and EDWARD L. BOLTON, citizens of the United States, residing at Kingsley, in the county of Wasco and State of Oregon, have invented certain new and useful Improvements in Harvester-Reels, of which the following is a specification.

As is well known, in the common form of harvester-reels at present in use horizontal slats carried by the reel are fixedly secured to the end portions of the radial arms of the reel. The slats as above disposed are adapted to strike the grain-heads with their flat sides in the rotation of the reel, and in so doing a certain quantity of the grain is wasted, the heads of the grain being scattered when struck by the flat sides of the reel-slats before the stalks are cut.

It is the object of this invention to mount the reel-slats upon the reel-arms so that as the reel rotates the slats will descend upon the grain edgewise, and thereby obviate the defect apparent in the ordinary form of reel.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a reel, showing the horizontal slats secured in accordance with my invention. Fig. 2 is an end elevation of the reel, showing more clearly the various positions assumed by the slats in the rotation thereof. Fig. 3 is a detail perspective view of the means for attaching the slats to the arms of the reel. Fig. 4 is a vertical sectional longitudinal view through the coupling members.

Corresponding and like parts are referred to in the following description and indicated in all the views of the drawings by the same reference characters.

As shown in the drawings, the general form of the reel 1 is the same as that commonly employed upon harvesters, said reel being provided with radial arms 2, extending therefrom, to which the horizontally-disposed slats 3 are secured. The slats 3 are adapted for a swinging movement relative to the arms 2, being pivoted thereto by means of a peculiar form of coupling device. The coupling device preferably used to secure the slats to the reel-arms comprises a fixed member 4 and a movable member or hinge member 5, pivoted thereto. The fixed member 4 is provided with spaced extensions 6, which receive therebetween the end portions of the arms 2 of the reel. Securing-fastenings pass through openings in extensions 6, rigidly securing the extensions in the manner before described. The hinge member 5 is provided with a lug 7, which is received in an opening in the end portion of the member 4, and through an opening in the lug 7 and a lateral opening in the end portion of the member 4 is passed a pivot-pin, thereby affording a pivotal connection between the members 4 and 5. The slats 3 are secured to the respective hinge members 5, carried by the end portions of the arms 2, and are thus adapted for a swinging or pivotal movement, as before described, so that as the reel rotates the slats will assume an approximately vertical position when the arms 2 reach an approximately horizontal position, and thus the slats pass edgewise into the grain at this point in their movement and do not scatter or knock out the heads of the grain. The movement of the members 5 is limited downwardly by means of a lateral stop member or projection 8 and upwardly by contact of the upper portion of the hinge member adjacent the pivotal fastening with the adjacent portion of the fixed member 4.

The manner of attaching the slats is very simple and gives rise to obvious advantages, which are fully apparent from the foregoing. It will be understood that the preferable manner of attaching the slats to the arms of the reel is shown. However, it is contemplated that the slats may be attached by various other coupling devices suitable for the purposes of the invention.

Having thus described the invention, what is claimed as new is—

1. In a harvester-reel, the combination, with supporting-arms, coupling members secured to the ends of said arms, hinge members carried by the coupling members aforesaid, lateral projections extended from the hinge members for engagement with the coupling members, and slats secured to the hinge members and pivotally supported thereby.

2. In a harvester-reel, the combination of supporting-arms, coupling members secured to the ends of said arms, hinge members pivoted to the coupling members, slats secured to the said hinge members, and a stop member projected from each of the hinge members for coöperation with the coupling members to limit the movement of the slats.

In testimony whereof we affix our signatures in presence of two witnesses.

GEORGE J. FRIEND. [L. S.]
  EDWARD L. BOLTON. [L. S.]

Witnesses:
  J. C. WARD,
  CHAS. H. REED.